US012466404B2

United States Patent
Puccetti et al.

(10) Patent No.: US 12,466,404 B2
(45) Date of Patent: Nov. 11, 2025

(54) ADAPTING A GAIN FACTOR OF AN ACCELERATION CONTROLLER FOR A MOTOR VEHICLE

(71) Applicant: Bayerische Motoren Werke Aktiengesellschaft, Munich (DE)

(72) Inventors: Luca Puccetti, Neufahrn (DE); Ahmed Yasser, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 136 days.

(21) Appl. No.: 18/276,757

(22) PCT Filed: Jan. 13, 2022

(86) PCT No.: PCT/EP2022/050683
§ 371 (c)(1),
(2) Date: Aug. 10, 2023

(87) PCT Pub. No.: WO2022/171378
PCT Pub. Date: Aug. 18, 2022

(65) Prior Publication Data
US 2024/0101111 A1    Mar. 28, 2024

(30) Foreign Application Priority Data
Feb. 12, 2021   (DE) ............... 10 2021 103 357.8

(51) Int. Cl.
*B60T 8/24*    (2006.01)
*B60W 30/14*   (2006.01)

(52) U.S. Cl.
CPC ....... *B60W 30/143* (2013.01); *B60W 2520/10* (2013.01); *B60W 2720/106* (2013.01)

(58) Field of Classification Search
CPC ........... B60W 30/143; B60W 2520/10; B60W 2720/106
See application file for complete search history.

(56) References Cited

U.S. PATENT DOCUMENTS

| 9,340,208 B1 | 5/2016 | Kuros et al. |
| 2008/0306669 A1 | 12/2008 | Wang et al. |

(Continued)

FOREIGN PATENT DOCUMENTS

| DE | 10 2008 026 753 A1 | 1/2009 |
| DE | 10 2008 034 188 A1 | 7/2009 |

(Continued)

OTHER PUBLICATIONS

International Search Report (PCT/ISA/210) issued in PCT Application No. PCT/EP2022/050683 dated Jul. 1, 2022 with English translation (4 pages).

(Continued)

*Primary Examiner* — Adam M Alharbi
(74) *Attorney, Agent, or Firm* — Crowell & Moring LLP

(57) ABSTRACT

Methods and devices for adapting a gain factor of an acceleration controller for a motor vehicle are provided. An acceleration controller specifies an acceleration setpoint for the motor vehicle in a time increment. The acceleration setpoint is specified as a function a speed setpoint of the motor vehicle, an actual speed of the motor vehicle, and the gain factor. The device stores the speed setpoint, the actual speed, and the acceleration setpoint specified as information for at least two time increments, select a first subset of the information, and train a model as a function of the first subset. The model predicts an actual speed in a later time increment from at least one stored actual speed and at least one stored acceleration setpoint, select a second subset of the information, and adapt the gain factor as a function of the second subset, the model and the acceleration controller.

8 Claims, 1 Drawing Sheet

(56) References Cited

U.S. PATENT DOCUMENTS

| | | | |
|---|---|---|---|
| 2010/0049400 A1 | 2/2010 | Duraiswamy et al. | |
| 2010/0268416 A1* | 10/2010 | Arai | B60W 40/076 |
| | | | 701/33.4 |
| 2015/0094924 A1* | 4/2015 | Takahashi | B60W 30/045 |
| | | | 701/70 |
| 2018/0164810 A1* | 6/2018 | Luo | B60W 10/06 |
| 2020/0339104 A1 | 10/2020 | Nahidi et al. | |

FOREIGN PATENT DOCUMENTS

| | | |
|---|---|---|
| DE | 10 2016 121 691 A1 | 5/2018 |
| DE | 10 2019 124 339 B3 | 9/2020 |
| DE | 10 2020 107 348 A1 | 10/2020 |
| EP | 1 382 477 A1 | 1/2004 |

OTHER PUBLICATIONS

German-language Written Opinion (PCT/ISA/237) issued in PCT Application No. PCT/EP2022/050683 dated Jul. 1, 2022 with English translation (9 pages).

German-language Search Report issued in German Application No. 10 2021 103 357.8 dated Sep. 9, 2021 with partial English translation (10 pages).

"Rechtsfolgen zunehmender Fahrzeugautomatisierung", Bundesanstalt fuer Strassenwesen (BASt) [German Federal Highway Research Institute], Forschung kompakt [Research News], Edition Nov. 2012 with English Abstract (two (2) pages).

"(R) Taxonomy and Definitions for Terms Related to Driving Automation Systems for On-Road Motor Vehicles", Surface Vehicle Recommended Practice, SAE (Society of Automotive Engineering) International, J3016™, Sep. 2016, pp. 1-30 (30 pages).

* cited by examiner

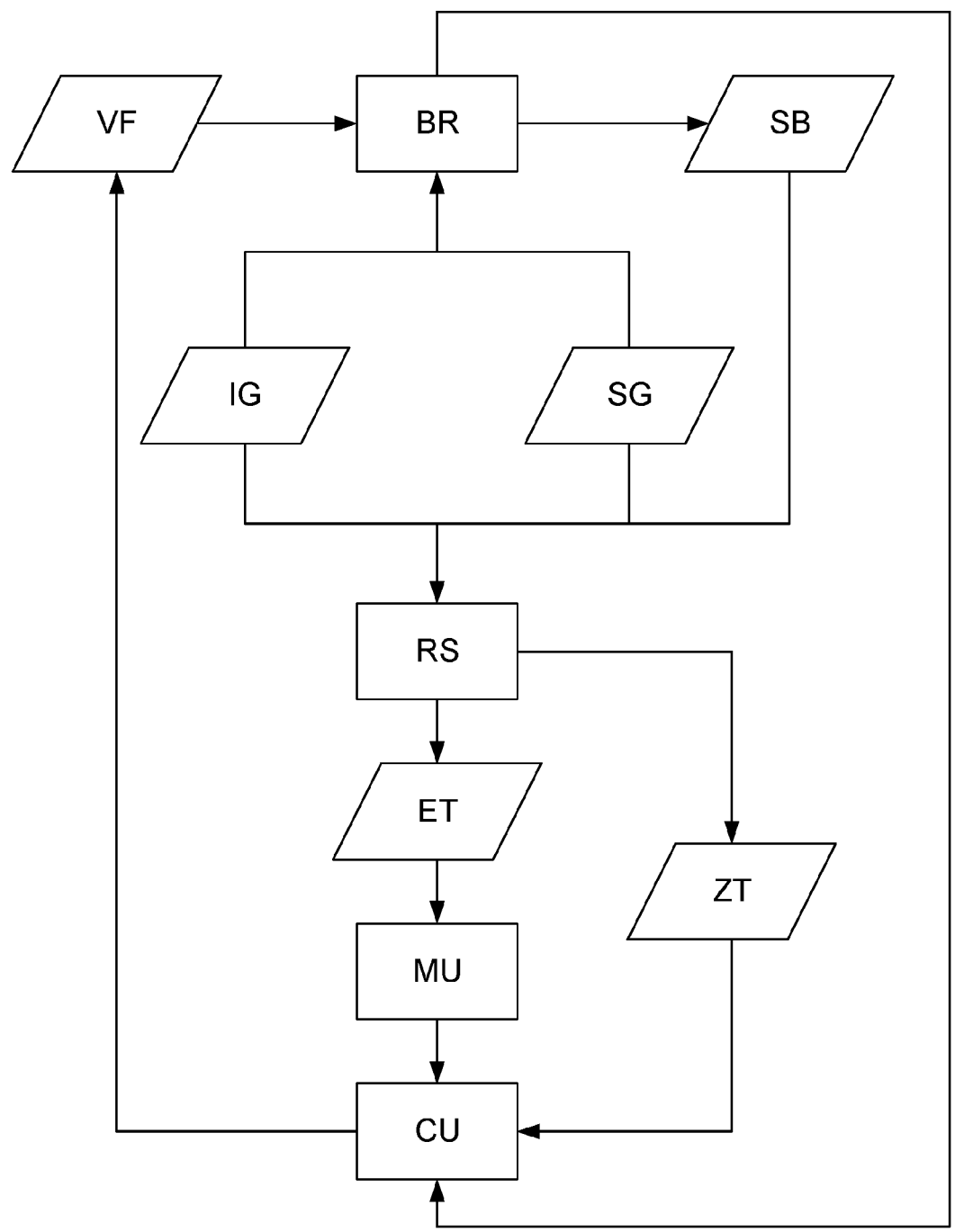

ADAPTING A GAIN FACTOR OF AN ACCELERATION CONTROLLER FOR A MOTOR VEHICLE

BACKGROUND AND SUMMARY OF THE INVENTION

The present subject matter relates to a device and a method for adapting a gain factor of an acceleration controller for a motor vehicle.

As used herein, the term "automated driving" means driving with automatic longitudinal or lateral guidance or autonomous driving with automatic longitudinal and lateral guidance. The term "automated driving" comprises automated driving with any desired level of automation. Examples of levels of automation are assisted, partly automated, highly automated or fully automated driving. These levels of automation have been defined by the German Federal Highway Research Institute (BASt). In assisted driving, the driver carries out the longitudinal or lateral guidance continuously, while the system performs the respective other functions within certain limits. In partly automated driving (TAF), the system performs the longitudinal and lateral guidance for a certain time period and/or in specific situations, the driver having to monitor the system continuously as in assisted driving. In highly automated driving (HAF), the system performs the longitudinal and lateral guidance for a certain time period without the driver having to monitor the system continuously; however, the driver must be in a position to perform the vehicle guidance within a certain time. In fully automated driving (VAF), the system can automatically manage the driving in all situations for a specific application; for this application, a driver is no longer necessary. The aforementioned four levels of automation according to the definition of the BASt correspond to SAE Level 1 to 4 of the SAE J3016 standard (SAE—Society of Automotive Engineering). For example, highly automated driving (HAF) according to the BASt corresponds to Level 3 of the SAE J3016 standard. Furthermore, in SAE J3016, the SAE Level 5 is provided as the highest level of automation, which is not contained in the definition of the BASt. The SAE Level 5 corresponds to driverless driving, in which the system is able to manage all the situations automatically like a human driver during the entire journey; in general, a driver is no longer necessary.

All longitudinally guiding systems are based on an acceleration controller, which determines an acceleration setpoint for the vehicle from a speed setpoint for the vehicle and an actual speed for the vehicle. The longitudinal guidance of the motor vehicle is then controlled at least as a function of this acceleration setpoint.

The parameterization of the acceleration controller is very complicated, since the acceleration controller must be adapted for every vehicle model and, for example, the vehicle mass and various properties of the drivetrain have an influence on the parameterization.

It is an object of the present subject matter to simplify the parameterization of the acceleration controller.

A first aspect of the present subject matter relates to a device for adapting a gain factor of an acceleration controller for a motor vehicle such as for an automated motor vehicle.

The acceleration controller is set up to specify an acceleration setpoint for the motor vehicle in a time increment as a function of a speed setpoint of the motor vehicle, an actual speed of the motor vehicle, and the gain factor.

The longitudinal guidance of the motor vehicle is then carried out at least as a function of the acceleration setpoint. The acceleration setpoint of a drive or engine controller is predefined as a target acceleration. Alternatively, or additionally, the acceleration setpoint is processed further before it is predefined to the drive or engine controller as a target acceleration.

The device is set up in each case to store the speed setpoint, the actual speed, and the acceleration setpoint predefined as a function thereof as information for at least two time increments.

The device is set up in each case to store the speed setpoint, the actual speed, and the acceleration setpoint predefined as a function thereof as a tuple so that it can also be seen from the stored information that the aforementioned data corresponds to the same time increment.

The device is set up in each case to store the speed setpoint, the actual speed, the acceleration setpoint predefined as a function thereof and the respective time increment as information for at least two time increments, so that a causal or temporary sequence of the aforementioned data can also be seen from the stored information.

In addition, the device is set up to select a first subset of the information, wherein the first subset comprises at most 150 or 200 tuples comprising speed setpoint, actual speed and/or acceleration setpoint. Here, the present subject matter is based on the finding that the number of tuples is chosen such that processing is possible under real-time conditions, which is to say while observing a binding deadline.

The device is set up to train a model as a function of the first subset, wherein the model is set up to predict an actual speed in a subsequent time increment from at least one stored actual speed and at least one stored acceleration setpoint.

Here, the present subject matter is based on the finding that the actual speed in the second time increment can be predicted by using the actual speed and the acceleration setpoint in a first time increment while taking account of the time difference of the first time increment and a second time increment following the first time increment.

Although an actual acceleration of the motor vehicle will frequently deviate from the acceleration setpoint of the motor vehicle, since the actual acceleration does not depend just on influences that can be controlled by the motor vehicle, e.g. on the slope of the roadway, on signal propagation times in the motor vehicle and/or system inertias, the model can be trained in retrospect by means of a monitored learning process, since the actual speed of the motor vehicle is stored for a plurality of time increments and is thus known.

In addition, the device is set up to select a second subset of the information, wherein the second subset comprises at most 20, 50, 100 or 150 tuples comprising speed setpoint, actual speed and/or acceleration setpoint.

In addition, the device is set up to adapt the gain factor as a function of the second subset, the model, and the acceleration controller.

Here, the present subject matter is based on the finding that the selection of the gain factor has a strong influence on how quickly and with what quality the actual speed of the motor vehicle adapts to a speed setpoint differing therefrom. For example, although a very high gain factor can ensure rapid adaptation of the actual speed to the speed setpoint, there is a risk of oscillations in the case of a very high gain factor in conjunction with time delays.

The device is set up to carry out the training of the model and the adaptation of the acceleration controller repeatedly in order to converge iteratively at an optimum gain factor. For example, by means of the suitable selection of the frequency with which the training of the model and the adaptation of the acceleration controller are carried out, the optimum can be found with little computing power.

In an advantageous example of the present subject matter, the acceleration controller is set up to determine the acceleration setpoint from the product of the gain factor and the difference between the speed setpoint and the actual speed.

In a further advantageous example of the present subject matter, the device is set up to store the information in a ring buffer, wherein a capacity of the ring buffer is limited to storing the information from at most 5000 time increments.

A ring buffer stores data continuously in a certain time period and overwrites this data again after the expiry of a predefined time, in order to free the storage space again for new data.

The time difference between two respective time increments is at most 20 ms, so that the ring buffer can store at most information from an interval of 100 s.

In a further advantageous example of the present subject matter, the device is set up to train the model by a first weighting factor and a second weighting factor being optimized such that a prediction error of the model is minimized.

The optimization of the first weighting factor and of the second weighting factor is carried out with a Levenberg-Marquardt algorithm. Here, the present subject matter is based on the finding that the Levenberg-Marquardt algorithm converges very quickly in this problem as compared with other optimization algorithms, which, in conjunction with further measures, permits a use of the present subject matter in the motor vehicle (that is to say "online" as compared with "off-line" training in a data center).

The first weighting factor specifies an influence of the at least one stored actual speed on the prediction. If the at least one stored actual speed comprises more than only exactly one actual speed, a plurality of first weighting factors can be used. Thus, for example, an individual first weighting factor can in each case be used for each of the plurality of actual speeds.

The second weighting factor specifies an influence of the at least one stored acceleration setpoint on the prediction. If the at least one stored acceleration setpoint comprises more than only exactly one acceleration setpoint, a plurality of second weighting factors can be used. Thus, for example, an individual second weighting factor can in each case be used for each of the plurality of acceleration setpoints.

In a further advantageous example of the present subject matter, the device is set up to adapt the gain factor by the device being set up to predict a state of the motor vehicle as a function of the second subset, the model, and the acceleration controller.

The state of the motor vehicle is a description of the actual dynamics of the motor vehicle and/or a description of control or setpoint specifications for systems of the motor vehicle which will influence the dynamics of the motor vehicle in the future. For example, the state of the motor vehicle comprises an acceleration setpoint of the motor vehicle for the current time increment, an actual speed of the motor vehicle for the current time increment and a speed setpoint of the motor vehicle for the current time increment. In addition, the state of the motor vehicle can also comprise an actual speed for at least one past time increment and/or an acceleration setpoint for at least one past time increment.

Since the complete state of the motor vehicle can be described only with a great deal of effort, the state of the motor vehicle in the present example of the present subject matter can be described only partially, for example by means of at least one actual speed of the motor vehicle, at least one speed setpoint of the motor vehicle and/or at least one acceleration setpoint of the motor vehicle.

In addition, the device is set up to adapt the gain factor such that a measure of controller quality based on the state of the motor vehicle is minimized.

The measure of controller quality describes a control deviation and/or a measure of passenger comfort.

The adaptation of the gain factor is carried out with a Levenberg-Marquardt algorithm. Here, the present subject matter is based on the finding that the Levenberg-Marquardt algorithm converges very quickly in this problem as compared with other optimization algorithms, which, in conjunction with further measures, permits a use of the present subject matter in the motor vehicle.

The state of the motor vehicle comprises at least one actual speed of the motor vehicle and/or at least one acceleration setpoint of the motor vehicle and/or at least one speed setpoint of the motor vehicle in a time increment.

Thus, for example by means of the model and starting from an initial state of the motor vehicle, it is possible to create a forecast as to how the acceleration setpoint, the speed setpoint, and the actual speed of the motor vehicle will develop in future time increments if various values are assumed for the gain factor of the acceleration controller.

In a further advantageous example of the present subject matter, the device is set up to store the information in a ring buffer, wherein a capacity of the ring buffer is limited to storing the information from at most 5000 time increments, to train the model by a first weighting factor and a second weighting factor being optimized with a Levenberg-Marquardt algorithm such that a prediction error of the model is minimized, wherein the first weighting factor specifies an influence of the at least one stored actual speed on the prediction, and wherein the second weighting factor specifies an influence of the at least one stored acceleration setpoint on the prediction, and to adapt the gain factor by predicting a state of the motor vehicle as a function of the second subset, the model, and the acceleration controller, and to optimize the gain factor with a Levenberg-Marquardt algorithm such that a measure of controller quality based on the state of the motor vehicle is minimized.

This advantageous example combines all the features which configure the present subject matter efficiently such that, despite the limited resources of automobile control devices, a use of the present subject matter directly in the motor vehicle is made possible.

A second aspect of the present subject matter relates to a method for adapting a gain factor of an acceleration controller for a motor vehicle, wherein the acceleration controller is set up to specify an acceleration setpoint for the motor vehicle in a time increment as a function of a speed setpoint of the motor vehicle, an actual speed of the motor vehicle, and the gain factor.

One step of the method includes storing the speed setpoint, the actual speed, and the acceleration setpoint specified as a function thereof as information for at least two time increments.

A further step of the method is selecting a first subset of the information.

A further step of the method is training a model as a function of the first subset, wherein the model is set up to predict an actual speed in a later time increment from at least one stored actual speed and at least one stored acceleration setpoint.

A further step of the method is selecting a second subset of the information.

A further step of the method is adapting the gain factor as a function of the second subset, the model, and the acceleration controller.

The above explanations relating to the device according to the present subject matter according to the first aspect of the present subject matter also apply in a corresponding way to the method according to the present subject matter according to the second aspect of the present subject matter.

The device and/or acceleration controller in the present disclosure may refer to a software module, a hardware module, or a combination thereof. Modules implemented by software are stored in memory or non-transitory computer-readable medium. The software modules, which include computer instructions or computer code, stored in the memory or medium can run on a processor or circuitry (e.g., ASIC, PLA, DSP, FPGA, or other integrated circuit) capable of executing computer instructions or computer code. A hardware module may be implemented using one or more processors or circuitry. A processor or circuitry can be used to implement one or more hardware modules. Each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices and stored in memory or non-transitory computer readable medium.

BRIEF DESCRIPTION OF THE DRAWING

FIG. 1 shows a device according to the present subject matter for adapting a gain factor VF of an acceleration controller BR for a motor vehicle.

DETAILED DESCRIPTION

The acceleration controller BR is set up to specify an acceleration setpoint SB for the motor vehicle in a time increment as a function of a speed setpoint SG of the motor vehicle, an actual speed IG of the motor vehicle, and the gain factor VF.

In addition, the acceleration controller BR is set up to determine the acceleration setpoint SB from the product of the gain factor VF and the difference between the speed setpoint SG and the actual speed IG.

The device is set up to store the speed setpoint SG, the actual speed IG, and the acceleration setpoint SB specified as a function thereof in each case as information for at least two time increments.

The device is set up to store the information in a ring buffer RS, wherein a capacity of the ring buffer RS is limited to storing the information from at most 5000 time increments.

In addition, the device is set up to select a first subset ET of the information and to train a model MU as a function of the first subset ET, wherein the model MU is set up to predict an actual speed IG in a later time increment from at least one stored actual speed IG and at least one stored acceleration setpoint SB.

The device is set up to train the model MU by a first weighting factor and a second weighting factor being optimized such that a prediction error of the model MU is minimized, wherein the first weighting factor specifies an influence of the at least one stored actual speed IG on the prediction, and wherein the second weighting factor specifies an influence of the at least one stored acceleration setpoint SB on the prediction.

In addition, the device is set up to select a second subset ZT of the information and to adapt the gain factor VF as a function of the second subset ZT, the model MU, and the acceleration controller BR, for example by using an optimization means CU.

The device is set up to adapt the gain factor VF by the device being set up to predict a state of the motor vehicle as a function of the second subset ZT, the model MU, and the acceleration controller BR and to adapt the gain factor VF such that a measure of controller quality based on the state of the motor vehicle is minimized.

The state of the motor vehicle comprises at least one actual speed IG of the motor vehicle and/or at least one acceleration setpoint SB of the motor vehicle in a time increment.

The invention claimed is:

1. A device for adapting a gain factor of an acceleration controller for a motor vehicle, comprising:
the acceleration controller configured to specify an acceleration setpoint for the motor vehicle in a time increment as a function of: a speed setpoint of the motor vehicle, an actual speed of the motor vehicle, and the gain factor;
a storage; and
a processor configured to:
store in the storage the speed setpoint, the actual speed, and the acceleration setpoint in each case as information for at least two time increments,
select a first subset of the information,
train a model as a function of the first subset, wherein the model is configured to predict an actual speed in a later time increment from at least one stored actual speed and at least one stored acceleration setpoint,
select a second subset of the information, and
adapt the gain factor as a function of the second subset, the model and the acceleration controller.

2. The device of claim 1, wherein the acceleration controller is further configured to:
determine the acceleration setpoint from the product of the gain factor and the difference between the speed setpoint and the actual speed.

3. The device of claim 1,
wherein the storage comprises a ring buffer, and
wherein a capacity of the ring buffer is limited to storing the information from at most 5000 time increments.

4. The device of claim 1,
wherein the processor is further configured to: train the model by a first weighting factor and a second weighting factor optimized in such a way that a prediction error of the model is minimized,
wherein the first weighting factor specifies an influence of the at least one stored actual speed on the prediction, and
wherein the second weighting factor specifies an influence of the at least one stored acceleration setpoint on the prediction.

5. The device of claim 1, wherein the processor is further configured to:
adapt the gain factor by the device being set up;

predict a state of the motor vehicle as a function of the second subset, the model and the acceleration controller; and adapt the gain factor such that a measure of controller quality based on the state of the motor vehicle is minimized.

6. The device of claim 5, wherein the state of the motor vehicle comprises the actual speed of the motor vehicle and/or the acceleration setpoint of the motor vehicle in at least one time increment.

7. The device of claim 1,
wherein the storage comprises a ring buffer with a capacity limited to storing the information from at most 5000 time increments, and
wherein the processor is further configured to:
train the model by a first weighting factor and a second weighting factor being optimized with a Levenberg-Marquardt algorithm such that a prediction error of the model is minimized, wherein the first weighting factor specifies an influence of the at least one stored actual speed on the prediction, and the second weighting factor specifies an influence of the at least one stored acceleration setpoint on the prediction, adapt the gain factor by predicting a state of the motor vehicle as a function of the second subset, the model, and the acceleration controller, and
optimize the gain factor with a Levenberg-Marquardt algorithm such that a measure of controller quality based on the state of the motor vehicle is minimized.

8. A method for adapting a gain factor of an acceleration controller for a motor vehicle, comprising:
specifying, by the acceleration controller, an acceleration setpoint for the motor vehicle in a time increment as a function of a speed setpoint of the motor vehicle, an actual speed of the motor vehicle and the gain factor;
storing the speed setpoint, the actual speed and the acceleration setpoint as information for at least two time increments;
selecting a first subset of the information;
training a model as a function of the first subset, wherein the model is configured to predict an actual speed in a later time increment from at least one stored actual speed and at least one stored acceleration setpoint,
selecting a second subset of the information; and
adapting the gain factor as a function of the second subset, the model, and the acceleration controller.

* * * * *